(12) United States Patent
Radulescu

(10) Patent No.: US 7,489,567 B2  
(45) Date of Patent: Feb. 10, 2009

(54) FIFO MEMORY DEVICE WITH NON-VOLATILE STORAGE STAGE

(75) Inventor: Andrei Radulescu, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/589,114

(22) PCT Filed: Feb. 8, 2005

(86) PCT No.: PCT/IB2005/050489

§ 371 (c)(1),
(2), (4) Date: Apr. 20, 2007

(87) PCT Pub. No.: WO2005/078572

PCT Pub. Date: Aug. 25, 2005

(65) Prior Publication Data

US 2007/0223265 A1     Sep. 27, 2007

(30) Foreign Application Priority Data

Feb. 12, 2004  (EP) .................... 04100526

(51) Int. Cl.
*G11C 7/00*    (2006.01)
(52) U.S. Cl. .................... 365/189.12; 365/185.08; 365/221
(58) Field of Classification Search ............. 365/221
See application file for complete search history.

(56) References Cited

U.S. PATENT DOCUMENTS

| | | | |
|---|---|---|---|
| 4,882,710 A * | 11/1989 | Hashimoto et al. ..... | 365/189.05 |
| 5,295,246 A | 3/1994 | Bischoff et al. | |
| 5,353,248 A | 10/1994 | Gupta et al. | |
| 5,495,451 A | 2/1996 | Cho et al. | |
| 6,678,201 B2 * | 1/2004 | Roohparvar et al. ..... | 365/221 |

* cited by examiner

*Primary Examiner*—Tan T. Nguyen

(57) ABSTRACT

A FIFO memory device (300) comprises a storage device (321) which is a non-volatile FIFO comprising a plurality of non-volatile storage elements or latches. The FIFO memory device (300) also comprises an input stage (315) which is a volatile FIFO and comprises a plurality of volatile storage elements. The input stage (315) provides a temporary store for data and thus hides the latency of the storage device (321).

13 Claims, 2 Drawing Sheets

FIFO MEMORY DEVICE WITH NON-VOLATILE STORAGE STAGE

The present invention relates to a FIFO memory device.

Current integrated circuits include a large number of small on-chip buffers. A large number of these buffers are used for decoupling intellectual property blocks (IPs), such as processing cores, general purpose processors (e.g. ARM™ or MIPS™), digital signal processors (DSPs), application specific processors (ASPs) or other hardware cores. Such decoupling buffers typically have a first in, first out (FIFO) operation, in some system there may be more than 200 FIFO buffers. For this reason, dedicated hardware FIFOs are utilized, which considerably reduce the area and increase the speed of such buffers.

There are two known types of hardware FIFOs dynamic and static. Dynamic FIFOs store the data just for a limited amount of time, after which, if not refreshed, it is lost. Static FIFOs store the data permanently.

Dynamic FIFOs are smaller than static FIFOs but in order to preserve the data, the FIFO must be refreshed and this involves extra logic to generate a refresh signal etc, whereas static FIFOs are larger in size but preserve data without the need of refreshing and hence do not require extra logic. Depending on the requirements, either of these devices is used.

The basic operation of a conventional FIFO will be explained with reference to FIGS. 1 and 2. In such a FIFO, as illustrated in FIG. 1, data is written into the first stage 101 of the FIFO 100 only when the stage 101 is empty. The data ripples through the FIFO 100 until it arrives behind the last occupied stage 103 of the FIFO 100. Upon reading, as shown in FIG. 2, data is transferred from the last stage 201 of the FIFO 200 only when the stage is not empty. The empty space ripples through the FIFO 200 until after the last occupied stage 203 in the FIFO 200.

It takes a finite time for data to propagate through FIFOs. Therefore, there is a finite time for a hole or empty space to propagate back through the FIFO during the reading operation, that is, the time taken after a word has been read until the space becomes available for writing. This is particularly problematical for static FIFO devices as these are pipelined. Therefore, once a place becomes available after data has been read from the FIFO, this space (or hole) must be propagated back through each of the pipeline's stages before it becomes visible at the input end and available for data to be written into it, i.e. latency is introduced.

As an example, if the time for propagating a hole is 360 ps per pipeline stage of a FIFO, then, for a FIFO of size 32, it takes 11520 ps for a space to become available at the "input" end of the FIFO memory device. In a system running at 200 MHz (i.e. 5 ns clock period), this gives an additional latency of 3 clock cycles. In a system running at 500 Mz this additional latency would be 6 cycles.

One known technique for improving latency in such devices is to provide extra stages to the FIFO. These additional stages are used just for latency hiding, e.g. 3 additional stages for 200 MHz system, and 6 additional stages for 500 MHz system. However, this increases the cost (in terms of Si area) of the buffer, e.g. 10% cost increase for 200 MHz, and 20% cost increase for 500 MHz system. The number of stages to be added is proportional to the length of the FIFO and frequency of operation of the device.

The object of the present invention is to provide a FIFO memory device which has improved latency whilst minimizing the cost of the device.

This is achieved by additional stages for hiding latency in a non-volatile (or static) FIFO; these additional stages are volatile (or dynamic) FIFOs. In accordance with a first aspect of the present invention, there is provided a FIFO memory device comprising a storage stage and input stage, the storage stage comprising a plurality of non-volatile storage elements and the input stage comprising a plurality of volatile storage elements. In this way the input stage effectively hides the latency of the storage stage.

The input stage may comprise a volatile FIFO memory which replaces the extra stages of the conventional hardware FIFO described above. Therefore, there is no longer any need to add these stages and the cost of the device is reduced.

Furthermore, FIFO buffers are invariably utilized to improve data throughput. The memory device in accordance with the aspect of the present invention can be implemented using a non-volatile memory, such as a static hardware FIFO device or SRAM. This can be used to accommodate a given average throughput for a stream of data. A volatile memory, such as a DRAM can then be utilized for the worst-case throughput for the stream of data. When this occurs for a small period of time, the DRAM can be used without refresh or, alternatively, a dynamic hardware FIFO can be used. In this case, the additional memory is added to accommodate extra data resulting from a temporarily higher-rate burst, which would otherwise result either in a stall of the IP producing the data, or result in an overflow. In the majority of cases, a volatile and cheaper memory can be used for the extra data, when the extra data is guaranteed to be absorbed in a limited amount of time.

This is particularly advantageous in IC designs which need additional storage for small time intervals. For example, hardware decoupling FIFO memories, where additional stages are added for latency hiding, and FIFO memories with extra volatile buffering to accommodate throughput peaks from a stream of data.

The present invention allows reduction in cost for FIFO memories that need additional stages for temporal data. This reduction in cost is achieved by using volatile instead of non-volatile memories. In the case of hardware FIFOs, this reduction of cost comes at no speed penalty, as both static (non-volatile) and dynamic (volatile) FIFOs run at the same speed.

Embodiments of the present invention will now be described with reference to the accompanying drawings in which.

Figure 1:
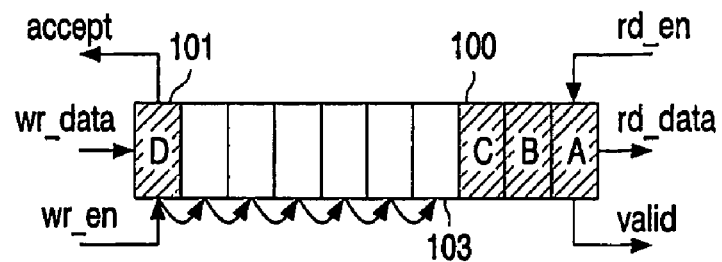
FIG. 1 is a schematic diagram of the write operation in a conventional FIFO.
Figure 1:
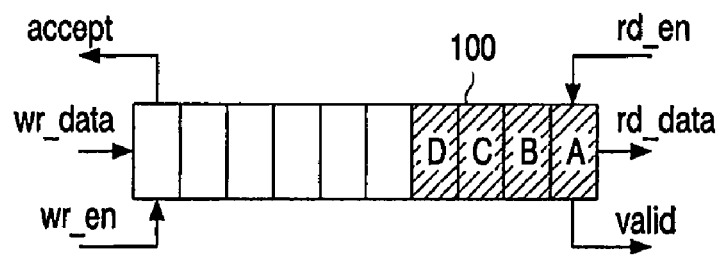
Figure 2:
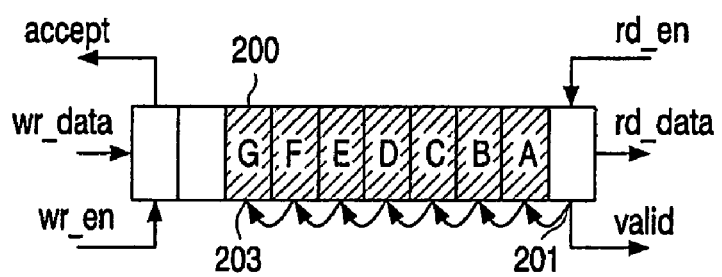
FIG. 2 is a schematic diagram of the read operation in a conventional FIFO.
Figure 2:
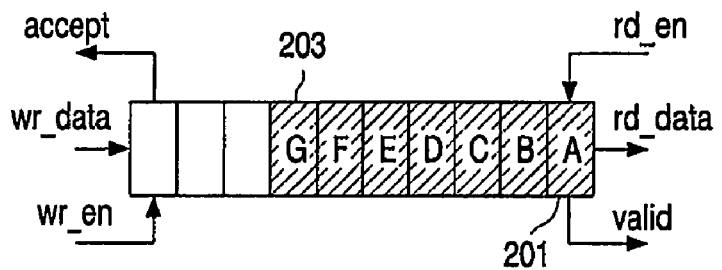

The embodiment of the present invention will now be described with reference to FIG. 3. The FIFO memory device 300 comprises a data input terminal 301, a data output terminal 303, a write enable (wr_en) terminal 305, a write accept (accept) terminal 307, a read enable (rd_en) terminal 309 and a read valid (valid) terminal 311. The data input terminal 301 is connected to the data input terminal 313 of an input buffer stage 315. The input buffer stage 315 comprises a plurality of dynamic, volatile storage elements (not shown here). The data output terminal 317 of the input buffer stage 315 is connected to the data input terminal 319 of a storage stage 321. The storage device 321 is a non-volatile, static FIFO comprising a plurality of static storage elements or latches (not shown here). The data output terminal 323 of the storage stage 321 is connected to the data output terminal 303 of memory device 300. The non-volatile FIFO 321 stores the data as in a conventional non-volatile, static FIFO. The input buffer stage 315 then operates to hide the latency of the storage stage 321 as the input buffer stage 315 can temporarily store data waiting for a space to be propagated back through the storage stage 315.

The write enable terminal 305 is connected to a first input terminal of a first AND gate 325. The second input terminal of the first AND gate 325 is connected to the output of a counter 327. The output of the first AND gate 325 provides the write enable signal (wr_en1) for the input buffer stage 315. The accept flag (accept1) of the input buffer stage 315 is provided on a first input of a second AND gate 329, the second input of the second AND gate 329 is connected to the output of the counter 327. The output of the second AND gate 329 is connected to the accept terminal 307 of the FIFO memory device 300 and to a first input of a third AND gate 331. The second input of the third AND gate 331 is connected to the write enable terminal 305 of the FIFO memory device 300. The output of the third AND gate 331 is connected to the counter 327. The accept flag (accept2) of the storage stage 321 is connected to the read enable (rd_en1) terminal of the input buffer stage 315. The valid flag (vaild1) of the input buffer stage 315 is connected to the write enable terminal (wr_en2) of the storage stage 321.

The read enable terminal 309 of the FIFO memory device 300 provides the read enable (rd_en2) for the storage stage 321. The valid flag (valid2) of the storage stage 321 is provided on the valid terminal 311 of the FIFO memory device 300. The data output terminal 303 of the FIFO memory device 300 is connected to the data output terminal of the storage stage 321. The flag (valid2) and read enable (rd_en2) of the storage stage 321 are the respective inputs of a fourth AND gate 333. The output of the fourth AND gate 333 is connected to the counter 327.

Figure 3:
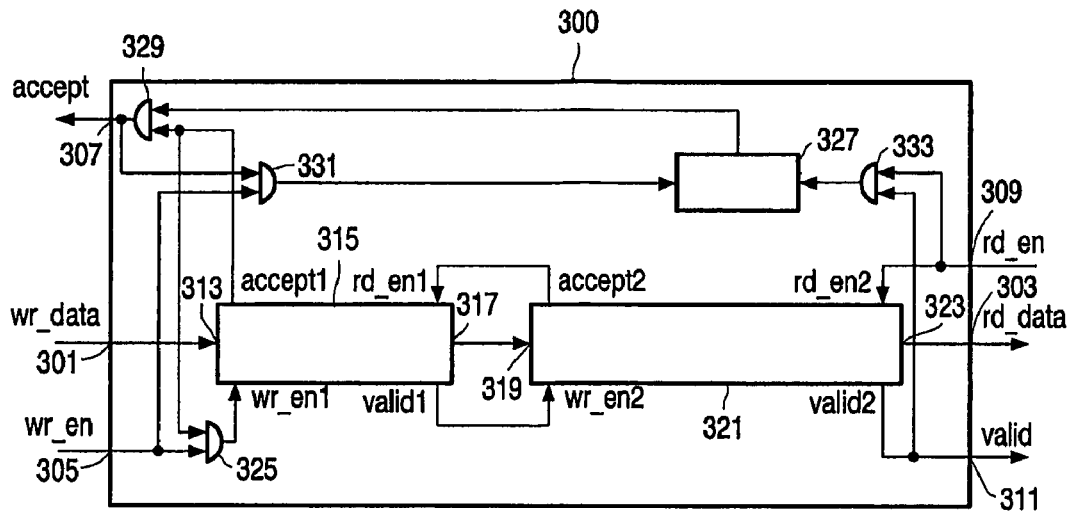
FIG. 3 is a block diagram of the memory device according to a first embodiment of the present invention.

The memory device 300 further comprises a read interface and write interface of conventional design and not shown in FIG. 3.

Operation of the memory device 300 of the first embodiment of the present invention will now be described.

During a read operation, the reader interface requests data from the memory device 300 by activating read enable (rd_en=high) on the terminal 309. The FIFO memory device 300 indicates that data is available by making the flag (valid) high on the terminal 311, i.e. the last stage of the storage FIFO 321 is occupied. When both rd_en and valid are high, a data word is transferred onto the data output terminal 303 of the FIFO memory device 300. Similarly for a write operation, the write interface makes a write request by making wr_en high on the terminal 305 and if the FIFO device 300 can accommodate data, i.e. the first stage of the input buffer 315 is empty, it makes the flag (accept) high on the terminal 307 and a word data is transferred onto the input terminal 313 of the input buffer stage 315. The data is then written in the first stage of the input buffer stage 315 until it arrives behind the last occupied stage. When the data reaches the last stage of the input buffer stage 315, the flag valid1 is activated and is provided as the write enable (wr_en2) of the storage stage 321 (a write request is made). If the first stage of the storage device 321 is empty, the flag accept2 is high and causes the read enable rd_en1 of the input buffer stage 315 to be high and the data held in the last stage of the input buffer stage 315 is transferred into the first stage of the storage FIFO 321. As in respect of the input buffer stage 315, the data ripples through the storage device 321 until it arrives behind the last occupied stage.

The FIFO memory device 300 further includes a counter 327 which maintains a count of the number of empty spaces of the input buffer stage and storage stage. When rd_en and valid are both high, i.e. a read request is made and a data word is transferred onto the output terminal 303, the contents of the counter 327 is incremented to indicate an empty space in the storage stage 321. Conversely when wr_en and accept are both high, i.e. a write request is made and data is transferred into the input buffer stage 315, the counter is decremented to indicate that an empty space is now occupied. In the event that there are empty spaces, the contents of the counter 327 is a positive value, and accept1 is high (there is an empty space at the first stage of the input buffer 315), the accept on terminal 307 is high and the input buffer stage 315 is ready to receive data on the input terminal 301 in the event of a write request. On reset, the counter 327 is initially set to equal to size of the storage stage 321.

Figure 4:
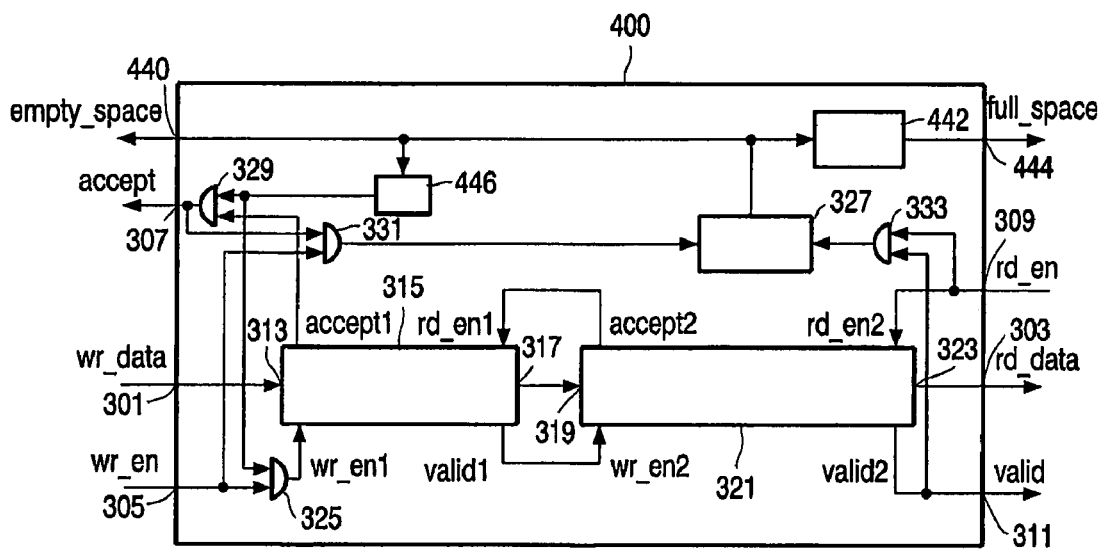
FIG. 4 is a block diagram of the memory device according to a second embodiment of the present invention.

The counter 327 can be used to provide information about whether or not there are spaces in the FIFO device 300 to the read interface and write interfaces. An implementation of this is shown in FIG. 4.

The FIFO device 400 according to a second embodiment of the present invention corresponds to the device of FIG. 3 and the same reference numerals have been used for the same components and detailed descriptions of these is not included here.

In the second embodiment, the counter 327 outputs the number of spaces. This is provided as a flag empty_space on a terminal 440 which is available to the write interface. This flag is also provided to a subtractor 442 in which the difference between the size of the FIFO and the number of spaces is output. If the output of the subtractor 442 is 0, a full_space flag is output on a terminal 444 to the read interface. The value on the output of the counter 327 is digitized by a digitizer 446 which outputs 1 if the output of the counter indicates at least on space (output value is greater than 0) and 0 if the output of the counter indicates no spaces. This is provided as the input to the second AND gate 329.

The FIFO memory device according to the preferred embodiments above comprises additional stages which hide the latency of the storage FIFO.

These additional stages (the volatile FIFO 315) are used only as temporary storage. Data is stored in this queue only for at most the time is takes for an empty item in the storage stage 321 to ripple through the FIFO to the output. This time is shorter than the retention time of a volatile FIFO (e.g. for the static, non-volatile FIFO in the PRLE/IC Design/DD&T group, the rippling time for an empty item is 360 ps per stage, whereas the retention time of a dynamic FIFO is 1 μs). Consequently, the volatile FIFO 315 requires no refresh logic. The refreshing of the volatile memory 315 can be dispensed with because the time the data resides in the volatile FIFO 315 (at most tens of ns) which is much smaller than the retention time of the volatile FIFO cells. Therefore, the additional circuitry for the refresh operation is not required further reducing the size and cost of the device.

One example of FIFO memory device in accordance with the preferred embodiments of the present invention when utilized in the, requires a dynamic cell having a size of 2.8 $m^2$ per bit, and a static cell having a size of 7.5 $m^2$ per bit. Consequently, there is a 63% reduction in cost for latency hiding. For the particular examples mentioned above, a 32 stage FIFOs in accordance with the embodiments of the present invention, operating at 200 MHz the reduction of the total FIFO cost is 6.3%. A 32 stage FIFOs in accordance with the embodiments of the present invention, operating at 500 MHz the reduction of the total FIFO cost is 12.6%.

Although preferred embodiments of the present invention has been illustrated in the accompanying drawings and described in the forgoing detailed description, it will be understood that the invention is not limited to the embodiments disclosed, but is capable of numerous variations, modifications without departing from the scope of the invention as set out in the following claims.

The invention claimed is:

1. A FIFO memory device comprising a storage stage and input stage, the storage stage comprising a plurality of static, non-volatile storage elements and the input stage comprising a plurality of dynamic, volatile storage elements.

2. The FIFO memory device according to claim 1, wherein the storage stage comprises a static, non-volatile FIFO memory device.

3. The FIFO memory device according to claim 1, wherein the input stage comprises a dynamic, volatile FIFO memory device.

4. The FIFO memory device according to claim 1, wherein the memory device further comprises means for monitoring the status of the input stage and/or storage stage.

5. The FIFO memory device according to claim 4 wherein the monitoring means includes a counter indicating the number of empty spaces.

6. The FIFO memory device according to claim 1 wherein the input stage and storage stage are connected in series.

7. An integrated circuit comprising at least one memory device according to claim 1.

8. A FIFO memory device comprising:
   a storage stage and input stage, the storage stage comprising a plurality of non-volatile storage elements and the input stage comprising a plurality of volatile storage elements; and,
   a means for monitoring the status of the input stage and/or storage stage.

9. The FIFO memory device according to claim 8, wherein the storage stage comprises a non-volatile FIFO memory device.

10. The FIFO memory device according to claim 8, wherein the input stage comprises a volatile FIFO memory device.

11. The FIFO memory device according to claim 8 wherein the monitoring means includes a counter indicating the number of empty spaces.

12. The FIFO memory device according to claim 8 wherein the input stage and storage stage are connected in series.

13. An integrated circuit comprising at least one memory device according to claim 8.

* * * * *